United States Patent [19]
Walsh

[11] Patent Number: 4,716,483
[45] Date of Patent: Dec. 29, 1987

[54] THREE PIECE HEAD ACTUATOR ARM ASSEMBLY FOR DISC DRIVE

[75] Inventor: Edward Walsh, Boise, Id.

[73] Assignee: Hewlett-Packard Company, Palo Alto, Calif.

[21] Appl. No.: 829,687

[22] Filed: Feb. 14, 1986

[51] Int. Cl.$^4$ .................. G11B 21/08; G11B 21/16
[52] U.S. Cl. ................................................. 360/106
[58] Field of Search ...................... 360/106, 97–99, 360/104

[56] References Cited

U.S. PATENT DOCUMENTS 4,346,416 8/1982 Riggle et al. ..................... 360/106
4,544,972 10/1985 Kogure et al. ..................... 360/106

Primary Examiner—Robert S. Tupper
Attorney, Agent, or Firm—William J. Bethurum

[57] ABSTRACT

A modular rotary disc drive or disc file having three major subassemblies. These are a rotary actuator structure subassembly having an actuator housing and a pivotally mounted actuator member in said housing, an armstack subassembly including the transducer heads and their electric circuits including the plug terminal therefor, and a magnetic driver subassembly having a magnetic housing and a movable coil assembly. The armstack subassembly is attached and removed from the actuator member without removing the actuator member from the actuator housing. The magnetic housing of the magnetic driver subassembly is secured to the actuator housing and its moving coil assembly is secured to the actuator member. This magnetic driver subassembly is also attached and removed as a unit without removing the actuator member from the actuator housing.

4 Claims, 12 Drawing Figures

THREE PIECE HEAD ACTUATOR ARM ASSEMBLY FOR DISC DRIVE

TECHNICAL FIELD

This invention relates generally to disk memory drives and more particulary to a disk memory drive assembly in which major functional subassemblies are easily removable as a unit for modification or replacement without dissasembling other functional subassemblies.

BACKGROUND ART

Computer disc drives are dynamic information storage units having high bit densities. They are very high precision units requiring close dimensional tolerances in manufacturing and are complex and delicate mechanically. They generally comprise rotating memory disks, transducer heads and a linear or pivotally mounted, magnetically driven actuator assembly which supports the transducer heads and provides bidirectional movement over the disks.

Prior art disc drives of the pivoting type have been difficult to assemble and disassemble. Frequently the transducer heads and supporting arms are part of an integral pivotally mounted actuator arm assembly which includes the lubricated actuator arm bearing structure. Removal of this assembly for testing or replacement of heads involves a major disassembly of the disk drive structure.

In other instances the individual arms supporting the transducer heads are separately detachable from a pivotally mounted actuator member. The electrical connections must be detached at the transducer head wires which is difficult and the arms and heads cannot be tested as a unit until after complete reassembly. Realignment of parts upon reassembly is time consuming because of the care that must be exercised in assuring accuracy.

In these efforts there is a risk of mechanically, magnetically or electrically damaging parts that cannot be removed while others are being tested. For example, testing of the magnetic drive on an actuator arm assembly to which the magnetic transducer heads are mounted may subject the delicate magnetic transducer heads to mechanical, electrical or magnetic damage. Where the bearing is a part of the actuator arm assembly, cleaning of the heads with cleaning agents involves a risk of dissolving grease in the bearing structure or requires the use of elaborate shielding in an attempt to prevent such damage. In instances where the arms are removed individually, the delicate head wires must be disconnected individually. This operation introduces opportunities for both electrical and mechanical head damage.

DISCLOSURE OF THE INVENTION

This invention provides improvements over prior art such as discussed above, in the provision of a modular arrangement of the major functional subassemblies of a disc memory drive. The innovative aspects reside in the unique organization of these major functional subassemblies, in an actuator arm assembly which enhances both manufactureability and testabiity in applications in a disc memory drive system. The pivotally mounted actuator arm assembly is structured using a modular approach, with each of the main functional subassemblies being separately assembled and tested.

As disclosed herein there are three main functional subassemblies comprising the actuator arm assembly. These may be identified as the arm stack subassembly which mounts the transducer heads, the magnetic drive subassembly having a movable coil and the actuator structure having a pivotally mounted actuator member to which both the arm stack subassembly and the movable coil or armature of the magnetic drive subassembly are detachably secured.

In greater detail the actuator structure comprises an actuator housing having a top section and a bottom section or base plate. An actuator member is pivotally mounted by a shaft assembly journalled between the top and bottom sections of this housing. The arm stack assembly or unit including the transducer heads together with the multipin plug and wiring for the heads, is detachably secured to one side of this actuator member in a position projecting radially outwardly from one side of the actuator housing. Fastening means are provided for detachably securing the arm stack subassembly to the actuator member in a position accessable and actuatable without removing the actuator member from the actuator housing.

The magnetic drive subassembly comprises a magnetic housing having an arcuate pole piece. A magnetic driver or armature comprises a coil which encompasses the arcuate pole piece. This armature is detachably secured to the opposite side of the pivotally mounted actuator member in a position projecting radially from the opposite side of the housing. Fastening means are provided for securing the armature to the actuator member. This fastening means, in a presently preferred embodiment of this invention, is disposed in a position providing accessability and actuatability from the side of the housing from which the arm stack projects. Alternatively, provision is made for accessability from the opposite side of the housing. The magnetic housing is secured to the actuator structure housing by means of readily accessible screws.

By means of this structural organization, the problems discussed in connection with the prior art herein above are completely obviated. The arm stack assembly is a unitized structure comprising a plurality of individual arms, the number of which is dictated by the number of discs in the disc drive. The transducer head assemblies each comprise a leaf spring and a transducer head. A gimbal structure mounts the transducer head on one end of the leaf spring. The other end of each leaf spring is mounted on an end of an arm. The leaf springs spring load the transducer heads as required to maintain their position "flying" on the film of air clinging to the adjacent rotating disc surface as the discs spin. The arm stack is carefully fabricated as a unitized structure providing spacing between the individual arm center lines corresponding closely to the center-to-center axial spacing of the discs. This assembly is bolted together and thereafter need not be disassembled, except perhaps for individual head rework. Servicing of the transducer heads for maintenance or replacement is now easily accomplished by the simple expedient of detaching this entire unitized arm stack assembly as a single structure by actuating the fastening means securing this unitized arm stack assembly to the actuator member. Now the arm stack and the transducer heads and wires and multipin plug, as a unit, are removable from the disc drive for rework or debugging such as head cleaning, repair, replacement, testing or alignment, in a location and environment suited for such operations while the remainder of the disc drive remains intact in a safe location.

In a presently preferred embodiment of this invention there are three screws attaching the magnetic housing to the actuator housing, and four screws which are accessable from the arm stack side of the actuator housing which attach the armature assembly of the magnetic drive to the actuator member. Removal or these screws permits detachment of the magnetic housing together with the armature from the actuator member and the actuator housing. Now this unit may be tested in an area removed from the remainder of the structure, particularly the transducer heads, which are easily mechanically or magnetically damaged.

This unique modular organization of major functional subassemblies of the disc drive, facilitates manufacturing, in that all major machining operations on the actuator structure housing such as drilling, boring, reaming, spot facing, etc., are performed along parallel axes between the top and bottom sections of the actuator structure housing. Additionally, the magnetic housing which is a two pole structure, comprises identical top and bottom magnetic housing sections inverted with respect to one another, the halves of which forms one pole, and between which the arcuate center pole, encompassed by the armature coil, is clamped.

Thus, in addition to the ease of assembly and disassembly discussed herein above, there is commonality in parts such as the top and bottom magnetic housing sections and the arms of the arms stack assembly which further simplifies manufacturing and reduces the parts inventory.

BEST MODE FOR CARRYING OUT THE INVENTION

FIGS. 1 through 9 illustrate the details of a presently preferred embodiment of this invention. Referring now to the plan and side views of FIGS. 1 and 2, there is illustrated a disc memory drive comprising a magnetic disc assembly 1 adapted to be driven by a motor (not shown). Normally, such a magnetic disc assembly will be driven at about 3600 revolutions per minute at constant speed. The unique major functional subassembly organization of this invention comprises the actuator structure subassembly 3, an arm stack subassembly 5, and a magnetic drive subassembly 7.

Figure 1:
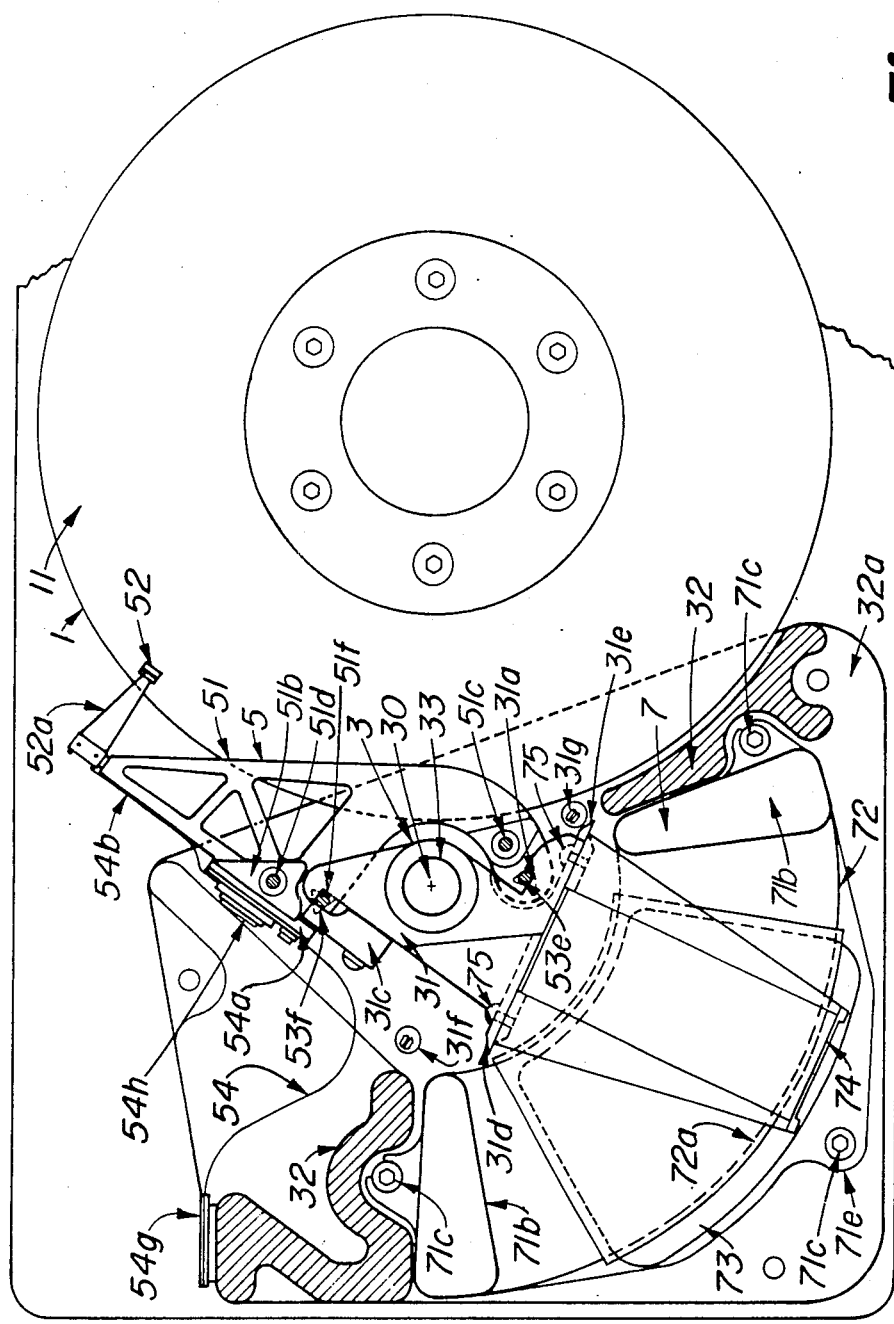
FIG. 1 is a plan view, partly in section, of a disc memory drive assembly embodying the principles of this invention.
Figure 2:
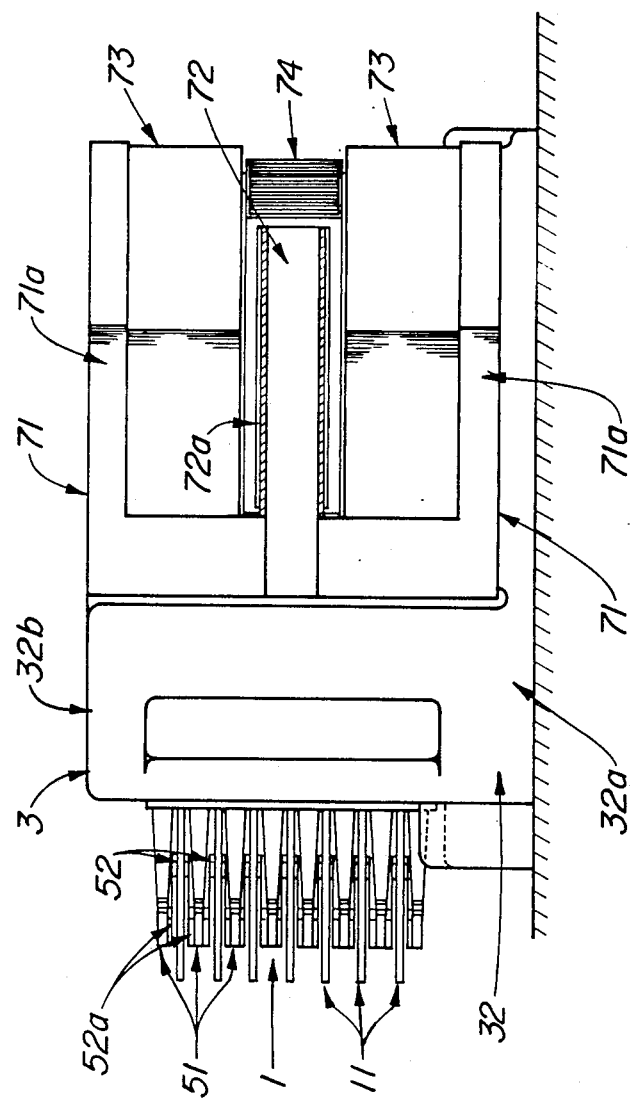
FIG. 2 is a side view, partly in section, of the disc drive assembly of FIG. 1.

As viewed in FIG. 1, the arm stack subassembly 5 projects radially outwardly from the axis 30 of the actuator member 31. One end of one or two leaf springs 52a, forming part of each transducer head assembly, as seen in FIGS. 1 and 2, is attached to the outer extremety of each arm 51 of the arm stack assembly, in a position projecting towards each of the discs 11. The individual magnetic heads 52 are thus positioned over the surface of a disc. The actuator arm assembly is in an angular position about the axis 30 positioning each magnetic head 52 in its extreme outer position on the confronting magnetic disc. The arm stack 5 is attached to the actuator member 31 at two positions 53e and 53f. The specific fastening means will be discussed at a later point.

Figure 3:
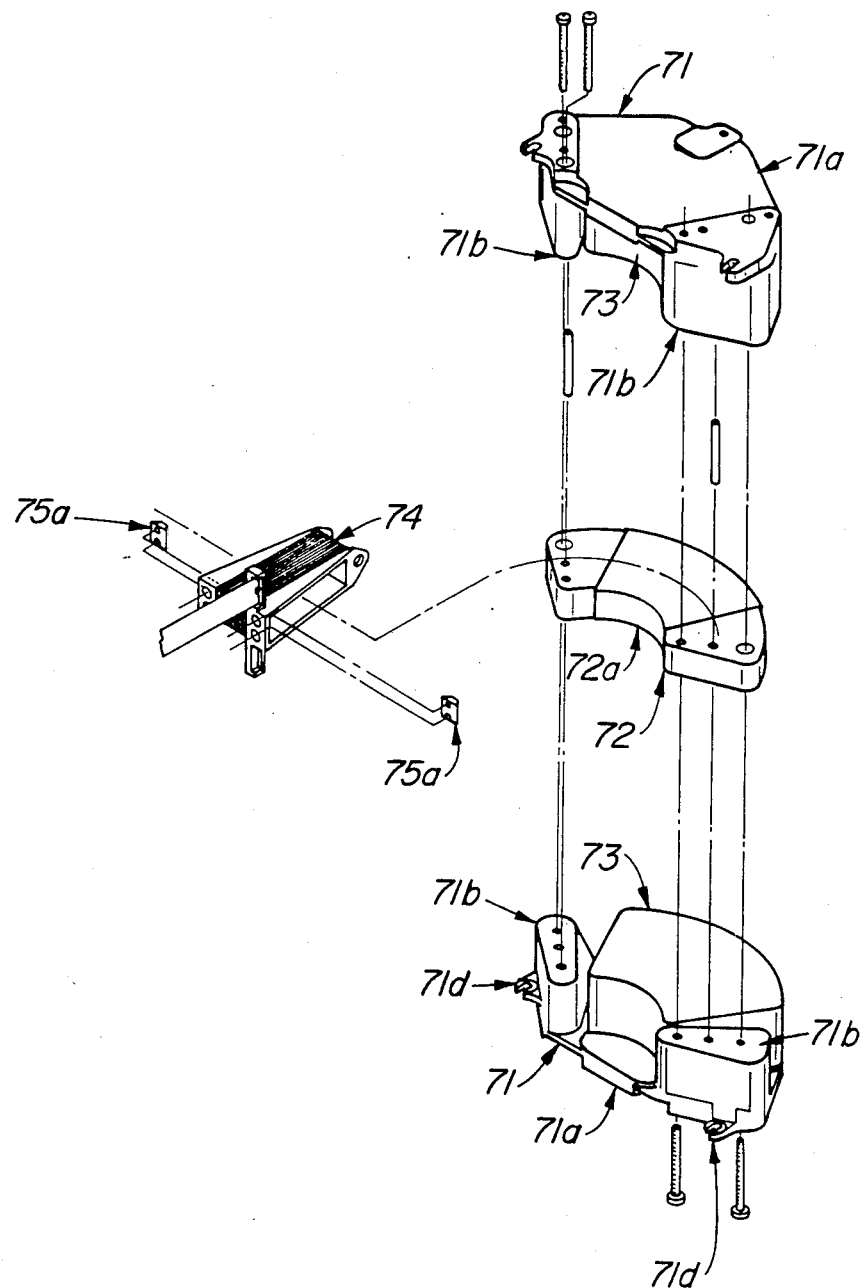
FIG. 3 is an exploded perspective view of the magnetic drive subassembly, showing the magnetic housing sections including the arcuate center pole and the moving coil assembly which encompasses the center pole.
Figure 4:
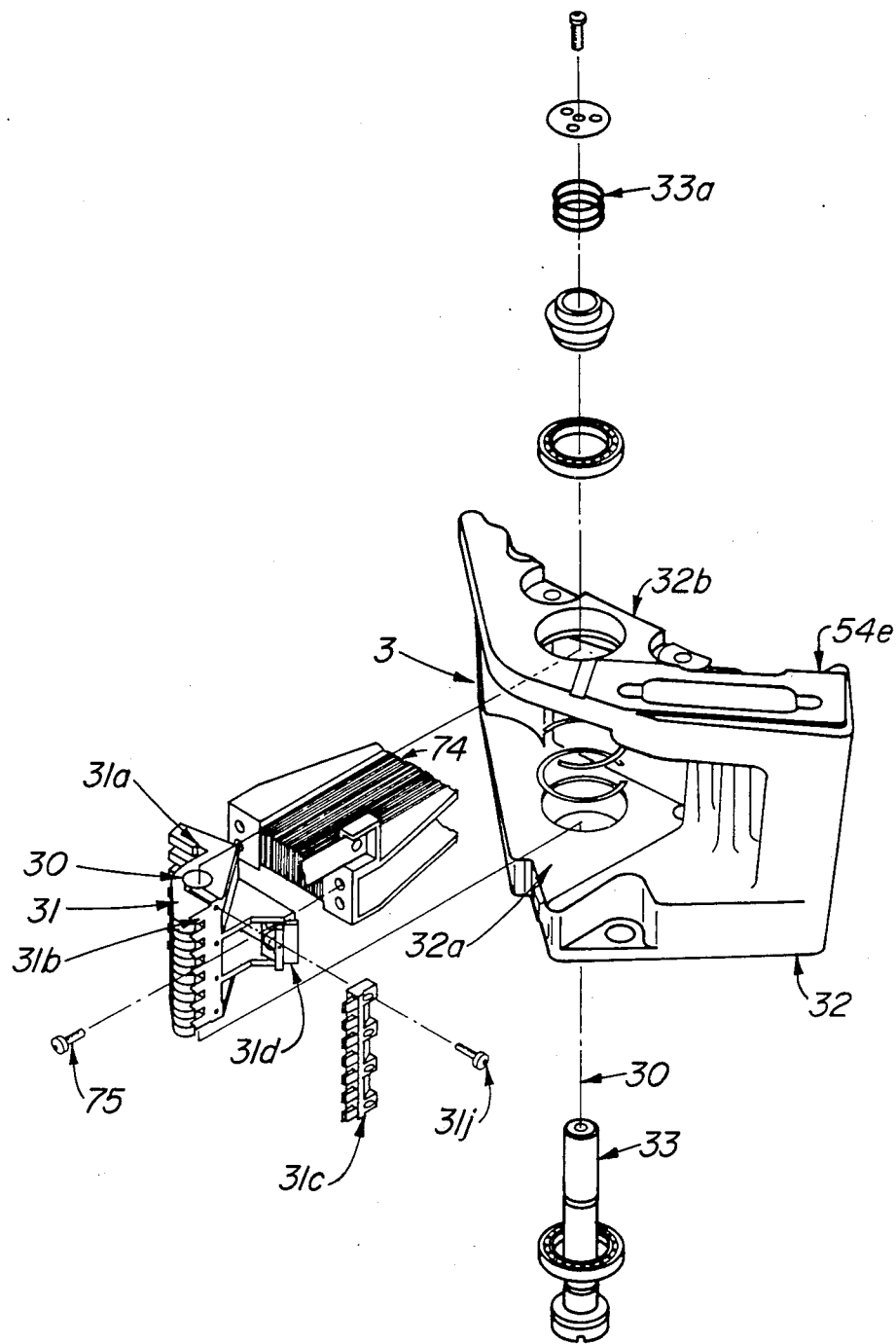
FIG. 4 is an exploded perspective view of the actuator structure depicting the actuator member, the actuator housing and the shaft assembly by which the actuator member is pivoted in the actuator housing.

The magnetic driver subassembly 7 is a two pole permanent magnet structure having a moving coil assembly. Upper and lower magnetic housing sections 71, which are identical, provide the two outer pole faces 71a, (FIG. 2). The center pole 72 is clamped at 71b between end sections of the upper and lower sections of the magnetic housing. A copper plate single turn winding 72a is disposed about the arcuate center pole over the area swept by the coil and functions as a short circuited single turn winding. A coil assembly 74 encompasses the arcuate center pole about the single turn winding. The radius of this arc is defined from the axis 30 about which the actuator member 31 pivots. The coil assembly 74 is secured to the arm holder 31 in a position projecting radially from the axis 30, in which position, as the arm holder pivots about the axis 30, it describes an arc corresponding to the arc of the center pole 72 of the magnetic driver. Screws 75 clearing through that part of the actuator member 31 against which the coil assembly abuts, thread into the coil assembly frame structure or into nut plates. The relative position and the shape of the abutting sections of the coil assembly 74 and the actuator member 31 are shown in FIG. 4. FIG. 3 illustrates the use of nut plates 75a on the coil assembly for receiving the screws 75.

Permanent magnets 73 secured to the inner faces of the outer halves of the magnetic housing sections 71 produce magnetic fields in the gap between the magnets and the center pole 72. Current of reversable polarity when applied to the coil 74 produces an electro-magnetic field interacting with the permanent magnet fields to produce reversable torques about the axis 30 for moving the magnetic heads 52 bidirectionally in an arcuate path over the discs.

Figure 7:
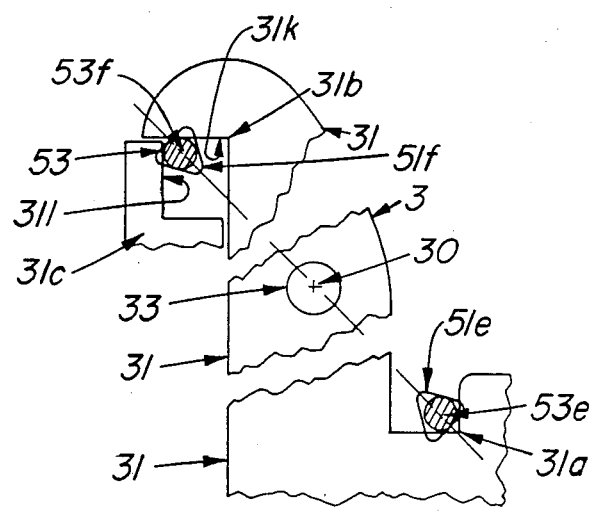
FIG. 7 is an enlarged fragmentary view illustrating the arrangement for attaching the arm stack unit to the actuator member.

Considering the major functional subassemblies in greater detail and beginning with the actuator structure subassembly 3, reference is now made to FIGS. 1, 2, 4, 5, 6 and 7. The actuator member 31 has a vertical or axial dimension which fits between the inner confronting faces of the upper and lower sections of the housing 32. The actuator member 31 pivots about a shaft assembly 33 which is journaled by bearings in the openings in the upper and lower sections 32a and 32b and is axially spring loaded in assembled position by means of a spring 33a. The actuator member 31 is a single piece structure of lightweight material such as aluminum or preferably magnesium and is shaped as viewed from the top as seen in FIGS. 1 and 7, to provide a notch 31a and a second notch having a surface or face 31b in substantially diametrically opposite positions with respect to the axis 30, in the slotted sections of the actuator member, to define two rows of aligned notches paralleling the pivot axis 30.

As described earlier, the coil assembly 74 is secured to a mating face of the actuator member 31. In this position, as seen in FIG. 1, and as is evident from FIG. 4, the coil assembly projects through an opening in the rear of the housing 32.

Figure 12:
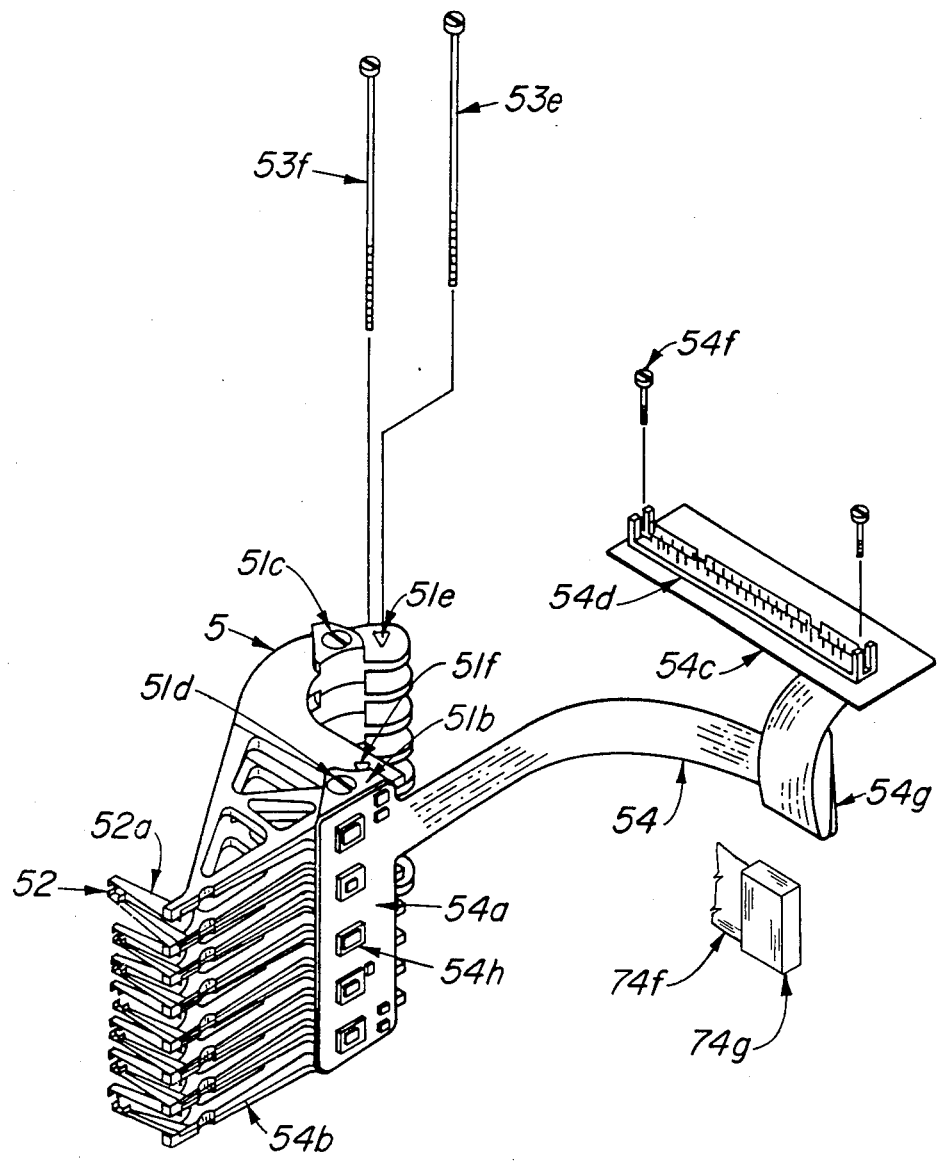
FIG. 12 shows a complete armstack assembly.

The arm stack subassembly 5, FIG. 12, comprises individual arms 51 which are stacked one upon the other, as seen also in FIG. 2. One arm 51 is detailed in FIG. 8 and 9. There are 7 discs and 8 arms, FIG. 2, which places an arm and a magnetic transducer head on each side of each disc. Each arm is provided with pads 51a and 51b on each side. These are carefully machined to provide the required thickness so that the center-to-center distances between the arms of the arm stack correspond to the center-to-center distances between the planes of the memory discs. Identically situated holes through the pads are aligned during assembly. Bolts 51c and 51d extending through those holes secure the arms in assembled position, providing the unitized arm stack 5.

The unity of this arm stack subassembly is evident from FIG. 12. The transducer head assemblies, 52, 52a, are mounted on the ends of the individual arms 51. Electrical connections to these magnetic heads are provided by a flat flexible circuit 54 having individual circuit traces for each head of the arm stack assembly and having a pad 54a at one end secured to the arm stack 5 on the surface formed by the edges of the individual pads 51b. Conveniently this may be an adhesive, or screw, type of attachment. Individual wires 54b connect the individual heads 52 to signal preamplifiers 54h on the pad 54a, which amplifies in turn, are connected to the circuit traces in the flat flexible circuit 54. The other end of the flexible circuit 54 terminates in a multi-pin connector 54d mounted upon a pad 54c. A further connection 74e is provided to attach the power leads for the coil, for routing of power through the flexible connection and out through the main connection. When the armstack 5 is mounted on the actuator 31, the pad 54c seats upon a surface 54e, FIG. 4, on the actuator housing 32. In this position screws 54f secure the connector 54d to the actuator housing. A pad 54g on the flexible circuit 54 ahead of the connector 54d is used to adhesively bond the flexible circuit 54 to the forward face of the actuator housing 32 relieving that end of the flexible circuit 54 coupled to the multi-pin connector 54d of stresses which might damage the electrical connections therein.

By this expedient removal of the armstack assembly 5 from the actuator member 31 also permits removal therewith of the electrical circuits including the multi-pin connector 54d with the arm stack assembly 5. Thus, none of the delicate electrical connections to the magnetic heads are disturbed. Equally importantly, the entire armstack assembly, complete with the electrical circuits, is readily testable by the simple expedient of plugging the electrical connector into an electrical testing unit.

Figure 8:
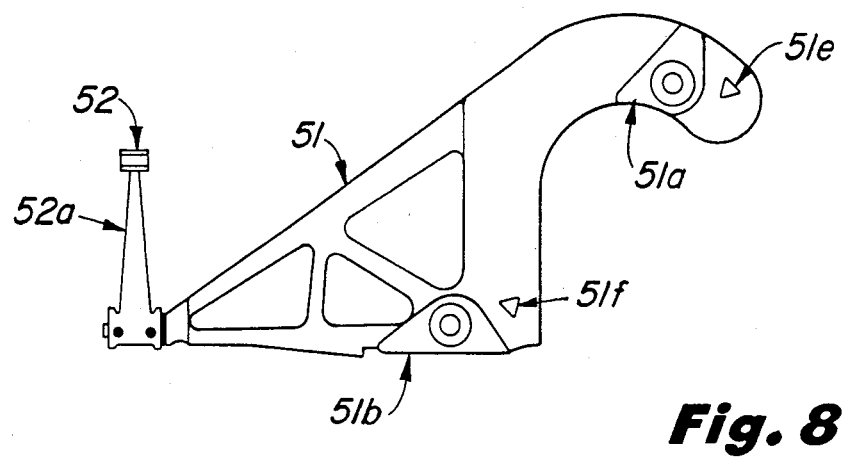
FIGS. 8 and 9 are respectively plan and edge views of one arm of the arm stack assembly.
Figure 9:
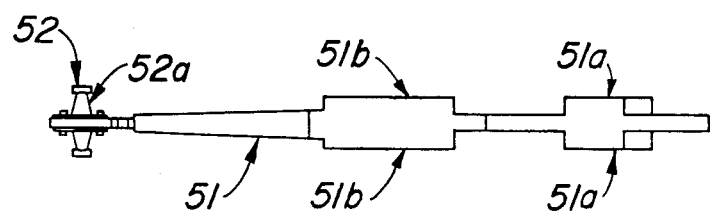

Each arm stack 5 is additionally provided with triangular holes 51e and 51f. As seen in FIGS. 1, 7 and 8, these triangular holes are oriented so that each has a vertex pointed towards the other. Stated otherwise these triangles have perpendicular bisectors which lie substantially along the same line. The spacing between the centers of these triangles in such, as seen in the enlarged illustration of FIG. 7, that when the arm stack 5 is secured to the actuator member 31, a pin 53e of circular cross section fitted within the notch 31a will have circumferential portions which are tangent to the two sides of the notch 31a, while a pin 53f at the notch 31b will have a single circumferential portion in contact with but one side or face 31k of the notch 31b. This, face 31k of the notch 31b forms an acute angle with a line from the center of the triangle at the notch 31a through the center of the circle or the triangle at notch 31b. Thus the application of a force to the armstack substantially paralleling the engaged face 31k of the notch 31b results in a force acting along a line between the centers of the triangles. Transverse forces due to rotation of the structure are resisted due to the driving angles of the contact face.

Upon assembly, pins 53e and 53f of circular cross-section, as seen in FIG. 7, slide through the aligned triangular openings 51e and 51f and, as seen in FIG. 12, are of a length to extend completely across the arm stack. The individual arms of the arm stack are then fitted into the slots defined between flanges of the actuator member 31. The pin 53f moves over the outer edge of the face 31k of the notch 31b as the arm stack is moved into position in the notches. Thereafter the pin 53e at the other end of the arm stack is engaged in the notch 31a. A clamp 31c, see FIG. 7, is then screwed into position on the actuator member 31. Projections of clamp 31b fitted between arms 51 and having faces 311 bearing upon the pin 53f, at notch 31b, force the pin 53f downwardly along the face 31k in the notch 31b. The camming action of the pin 53f against the face 31k of the notch 31b, forces the pin 53e at the other end of the arm stack into the notch 31a. Thus the pin 53e at notch 31a is pressed against the two faces of the notch 31a and against the two sides of the triangle 51e which rigidly secures the armstack as a unit to the actuator member 31.

In the attachment of the arm stack to the actuator member, provision has been made for providing a positive and precise alignment of the arm stack with respect to the actuator member 31 and the magnetic disc assembly 1, while at the same time providing an easily accessable and actuatable fastening means for detaching and reinstalling the arm stack in the actuator system.

Figure 5:
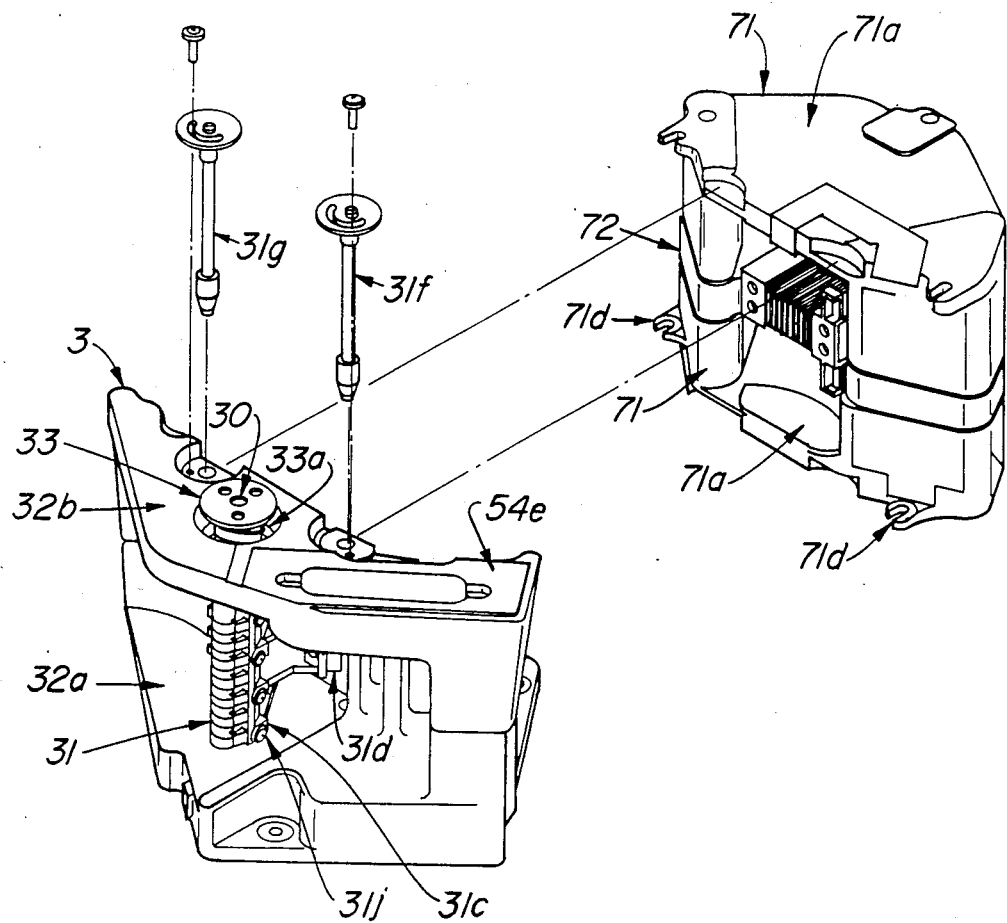
FIG. 5 is an exploded perspective view showing the relationship of the actuator housing and the magnetic drive subassembly.
Figure 6:
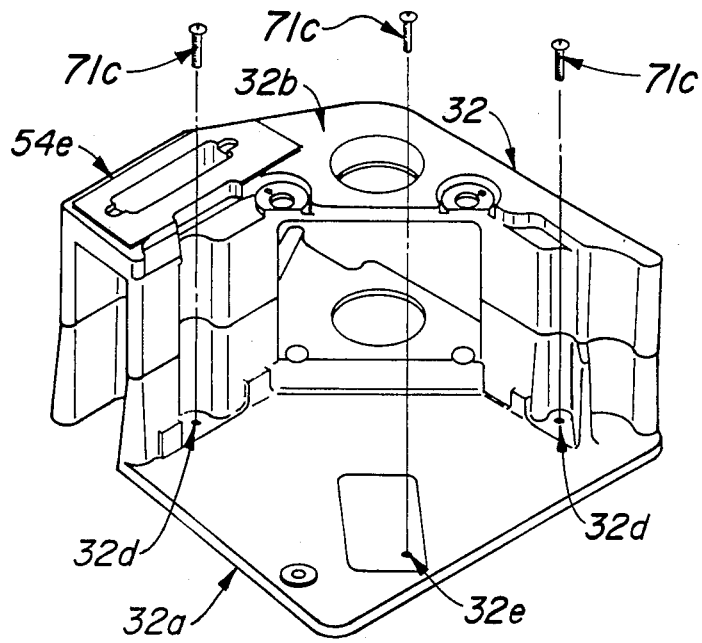
FIG. 6 is a perspective view of the actuator housing viewed from the side opposite to that shown in FIG. 5.

The magnetic driver subassembly is also simply detached and reinstalled. As noted in the summary of the invention, there are three screws securing the magnetic housing 7 to the actuator housing 32. In FIG. 1, these screws are designated 71c. As seen in FIG. 5, slotted pads 71d project from opposite sides of the bottom magnetic housing section 71. The actuator housing 32 is provided with a bottom plate 32a, seen in FIGS. 1 and 6, which extends beneath the magnetic housing assemblies 71. This plate is provided with complimentary pads 32d. Screws 71c are normally threaded into the threaded holes in the pads 32d leaving clearance for receiving the notches in the pads 71d. The third screw 71c clears through a hole in a pad 71e on the back side of the bottom magnetic housing 71, as seen in FIG. 1, and threads into a hole 32e in the bottom plate 32a, as seen in FIG. 7, of the actuator housing 32. To detach the magnetic driver subassembly, it is only necessary to loosen the screws 71c at the pads 71d and to remove the screw at the pad 71e. Thereafter removal of the screws 75 which releases the coil assembly, permits removal of the entire magnetic driver subassembly without disturbing any of the other parts.

The actuator arm assembly angular limits of movement are controlled, in controlling the outer and inner limits of transducer head displacement on the discs, by pads 31d and 31e which are formed in the rear extentions of the rear extremeties of the actuator member 31. In each of the angular extremes of the actuator arm assembly, these pads respectively engage either an eccentric pin 31f or an eccentric pin 31g. The pad 31e is shown in engagement with the eccentric pin 31g in FIG. 1. (See also the actuator member 31 of FIG. 5). These eccentric pins are fitted through holes in the actuator housing assembly 32 as seen in FIG. 5 and when rotated provide precise limit stop adjustments.

In another embodiment of this invention provision is made for detaching the magnetic coil assembly from the back side of the disc drive assembly rather than from the same side as the arm stack unit.

Figure 10:
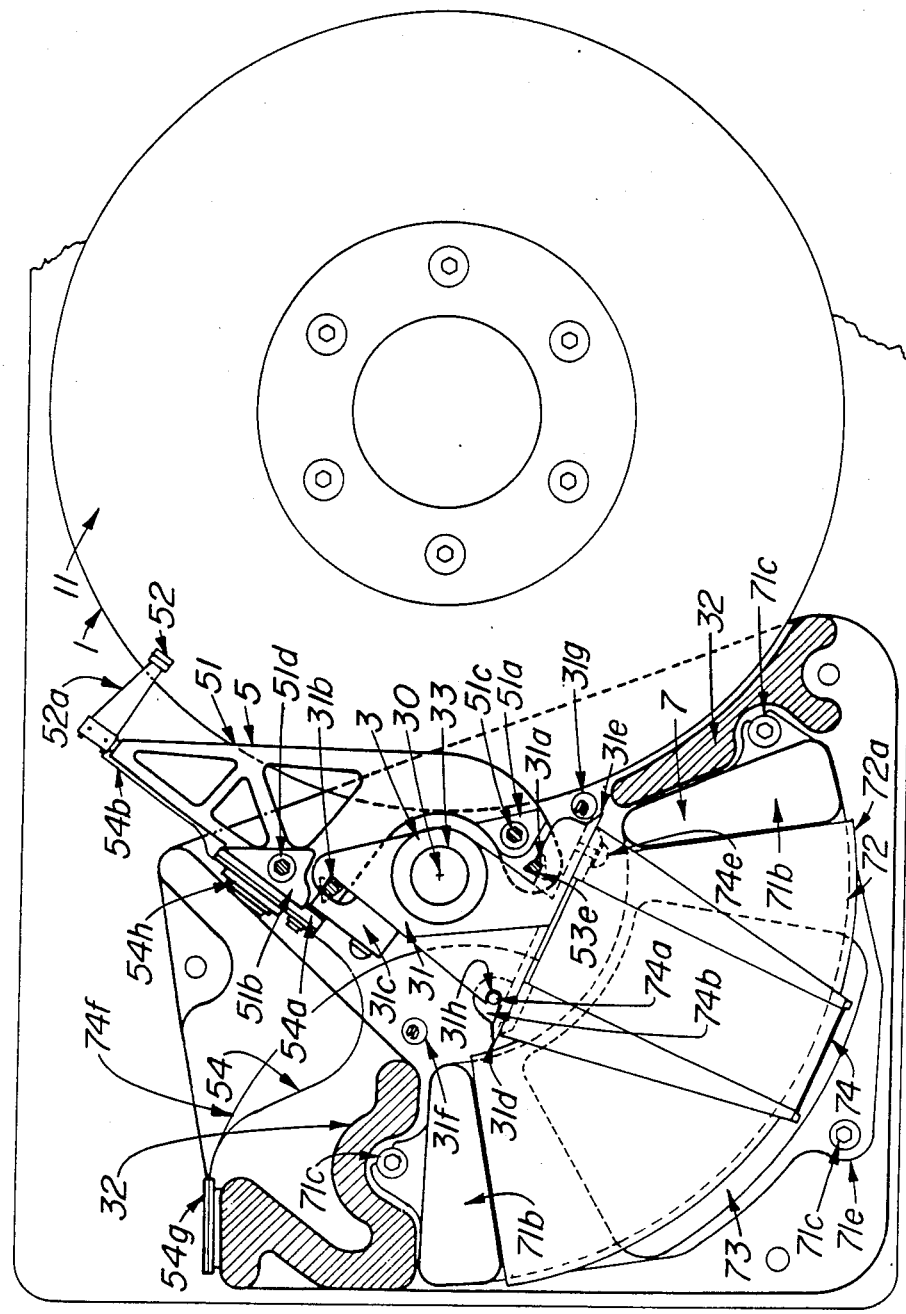
FIG. 10 illustrates another embodiment of this invention.
Figure 11:
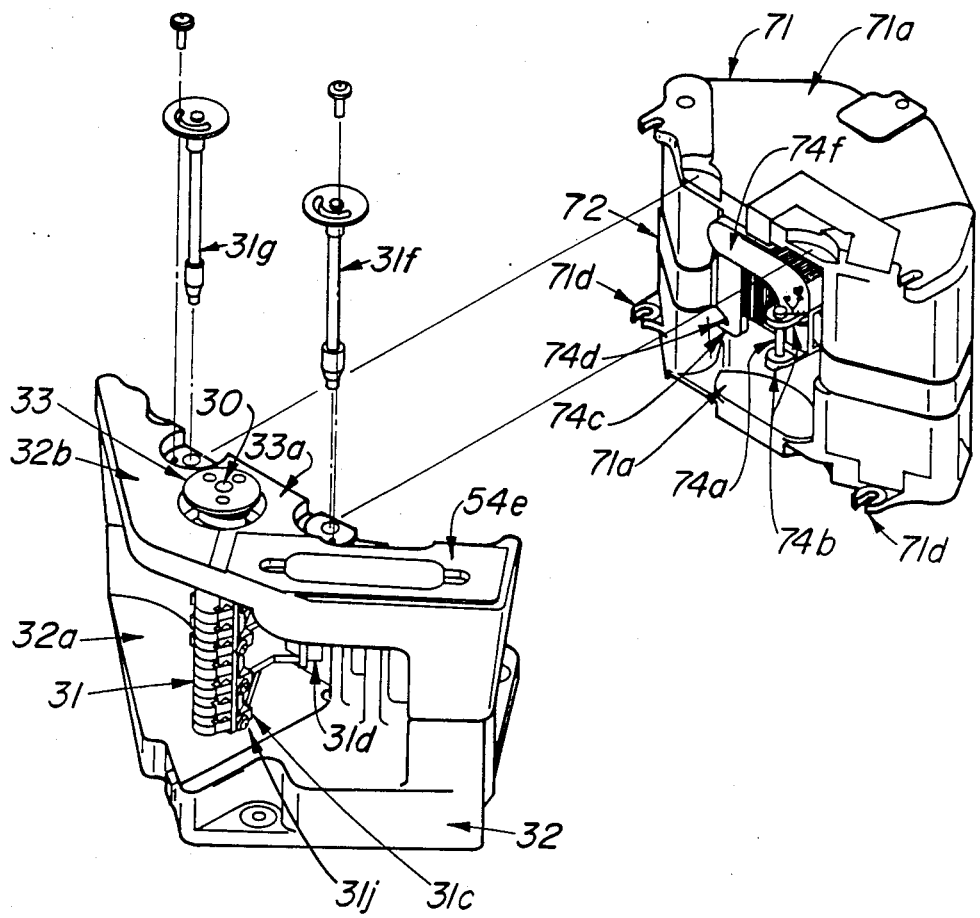
FIG. 11 is an exploded perspective view of the embodiment of FIG. 10, showing additional details.

This is shown in FIGS. 10 and 11. The magnetic driver housing 71 is connected to the actuator housing 32 using three screws, as described before. The actuator member 31 is now provided with a slot 31h (see FIG. 10) in the left side edge, adjacent the rear mounting face of the actuator member 31 which receives the moving coil assembly 74. As seen in FIGS. 10 and 11, a pin 74a is mounted between brackets 74b projecting from the mounting face of the coil housing. This pin 74a engages the slot 31h. The opposite side of the coil housing is provided with upper and lower extensions 74c, only one of which is seen in FIG. 11. Slots 74d in each extension open through the outer edges of these extensions. Screws, one of which is shown at 74e in FIG. 10 thread into the actuator member 31 in positions clearing the thickness of the extensions 74c.

Attachment of the coil housing to the actuator is accomplished when the magnetic driver is being moved into position by bringing the confronting faces of the attachment member and the coil housing into contact with the coil housing displaced to the left of the actuator member. Relative movement of the actuator member and the coil housing engages the pin 74a in the slot 31h while engaging the extensions 74c beneath the heads of screws 74e via the slots 74d. The sides of the slot 31h slope upwardly from the plane of the mounting faces and as the pin 74a moves into the slot 71h the mounting faces engage. Screws 74e now are tightened to secure the assembly. The screws 74e are accessable through the opening in the rear face of the magnetic housing.

INDUSTRIAL APPLICABILITY

Computer disc memory drives or files as they are known are widely used in computers and digital communication systems for storing information useful in performing arithmetic operations or data processing functions. Such equipment is extremely expensive and is difficult to manufacture. As noted hereinabove, this invention, in its unique modular organization, while providing improvements in operability and reliability by reason of its organization, reduces both manufacturing costs and maintenance efforts.

What is claimed:

1. In a disc drive assembly having a rotatable memory disc and a transducer head for deriving information from said memory disc, means for supporting and moving said transducer head over said memory disc comprising:
   a. an actuator structure having side sections and upper and lower section providing a front and a rear opening;
   b. an actuator member having front and rear sections;
   c. bearing means in said upper and lower sections of said actuator structure mounting said actuator member for angular movement and positioning said front and rear sections of said actuator member in locations accessible at said front opening of said actuator structure;
   d. a unitized transducer head support structure;
   e. fastening means detachably mounting said support structure on said front section of said actuator member in a position projecting from said front opening of said actuator structure, said fastening means being accessible and actuatable at the front of said actuator structure without removing said actuator member from said support structure;
   f. a magnetic driver having a housing and a movable member;
   g. means detachable securing said housing to said actuator structure with said movable member adjacent said rear face of said actuator member; and
   h. fastening means accessible and actuatable at said front opening, for detachably securing said movable member to said actuator member at said rear face.

2. In a disc drive assembly having a rotatable memory disc and a transducer head for deriving information from said memory disc, means for supporting and moving said transducer head over said memory disc, comprising:
   a. an actuator structure having side sections and upper and lower sections providing a front and a rear opening and;
   b. an actuator member having front and rear sections;
   c. bearing means rotatably mounting said actuator member in said upper and lower sections of said actuator structure and positioning said front and rear sections of said actuator member in locations accessible at said front opening and said rear opening, respectively, of said actuator structure;
   d. a unitized transducer head support structure;
   e. fastening means detachably mounting said support structure on said front section of said actuator member in a position projecting from said front opening of said actuator structure, said fastening means being accessible and actuatable at the front of said actuator structure without removing said actuator member from said support structure;
   f. a magnetic driver having a housing and a movable member;
   g. means detachably securing said housing to said actuator structure with said movable member adjacent said rear face of said actuator member; and
   h. fastening means accessible and actuatable at said rear opening, detachable securing said movable member to said actuator member at said rear face.

3. In a disc memory drive assembly having at least one memory disc rotatable about a spin axis and a transducer head for deriving information from said memory disc, means for supporting and moving said transducer head over said disc, comprising:
a. an actuator member;
b. an actuator support pivotally mounting said actuator member about a pivot axis paralleling said spin axis and adjacent to said memory disc;
c. a transducer head arm;
d. means at one extremity of said transducer head arm mounting a transducer head;
e. fastening means detachably securing the other end of said transducer head arm to said actuator member in a position to move said transducer head bidirectionally in an arcuate path over said memory disc, which position provides access to said fastening means for attaching and detaching said transducer head arm to and from said actuator member without dismounting said actuator member;
f. a magnetic driver having a movable member for driving said actuator member about said pivot axis; and
g. said actuator member having a slot in an edge thereof and a screw in a position displaced from said slot, both on a side of said actuator member opposite said transducer head arm;
h. a pin on said movable member for engaging said slot;
i. said movable member having a slot therein for engaging said screw;
j. said slot in said actuator member and said slot in said movable member being oriented so that relative transverse movement of said actuator member an said movable member engages said pin with said slot in said actuator member and engages said slot in said movable member with said screw in said actuator member whereby tightening of said screw secures said movable member to said actuator member.

4. The invention as set forth in claim 3 wherein
a. said slot in said actuator member is angularly disposed to move said movable member against said actuator member as said pin enters said slot in said actuator member.

* * * * *